Jan. 20, 1970 R. L. RICHMAN ET AL 3,491,340

DIGITAL DATA COMMUNICATION NETWORK MONITOR SYSTEM

Filed Oct. 11, 1966 3 Sheets-Sheet 1

INVENTOR.
ROBERT L. RICHMAN
ROBERT P. McMANUS
LESTER J. KINKEL
BY
ATTORNEYS

DIGITAL DATA COMMUNICATION NETWORK MONITOR SYSTEM

Filed Oct. 11, 1966

INVENTORS
ROBERT L. RICHMAN
ROBERT P. McMANUS
LESTER J. KINKEL
BY
Roy Miller
ATTORNEYS

DIGITAL DATA COMMUNICATION NETWORK MONITOR SYSTEM

Filed Oct. 11, 1966 3 Sheets-Sheet 3

INVENTORS
ROBERT L. RICHMAN
ROBERT P. McMANUS
LESTER J. KINKEL
BY
ATTORNEYS 3,491,340
Patented Jan. 20, 1970

3,491,340

DIGITAL DATA COMMUNICATION NETWORK MONITOR SYSTEM

Robert L. Richman, Sunnyvale, and Robert P. McManus and Lester J. Kinkel, San Diego, Calif., assignors to the United States of America as represented by the Secretary of the Navy Continuation-in-part of application Ser. No. 257,348, Feb. 8, 1963. This application Oct. 11, 1966, Ser. No. 607,084
Int. Cl. G11b *13/00;* G06f *1/00, 7/00*
U.S. Cl. 340—172.5 6 Claims

ABSTRACT OF THE DISCLOSURE

A monitoring system detects and records certain signal conditions such as changes of state or abnormal operation in a multiple station digital data network. Each station includes signal, receiving transmitting means and a monitor. A transition detector within the monitor detects certain signal conditions such as abnormal operation or malfunctions and produces a binary digital output signal indicative of the condition detected. Binary digital time reference signals are generated in each monitor relative to the occurrence of the transition detector output. Each monitor also includes actuating means responsive to the transition detector output for enabling its associated source of time reference signals so that a change of state of control level signal simultaneously received at each station synchronously actuates the respective sources of time reference signals at the multiple stations. Buffer means is provided to store the time reference signals and transition detector output signals so that they may be recorded in relative time disposition.

Statement of government interest

Figure 1:
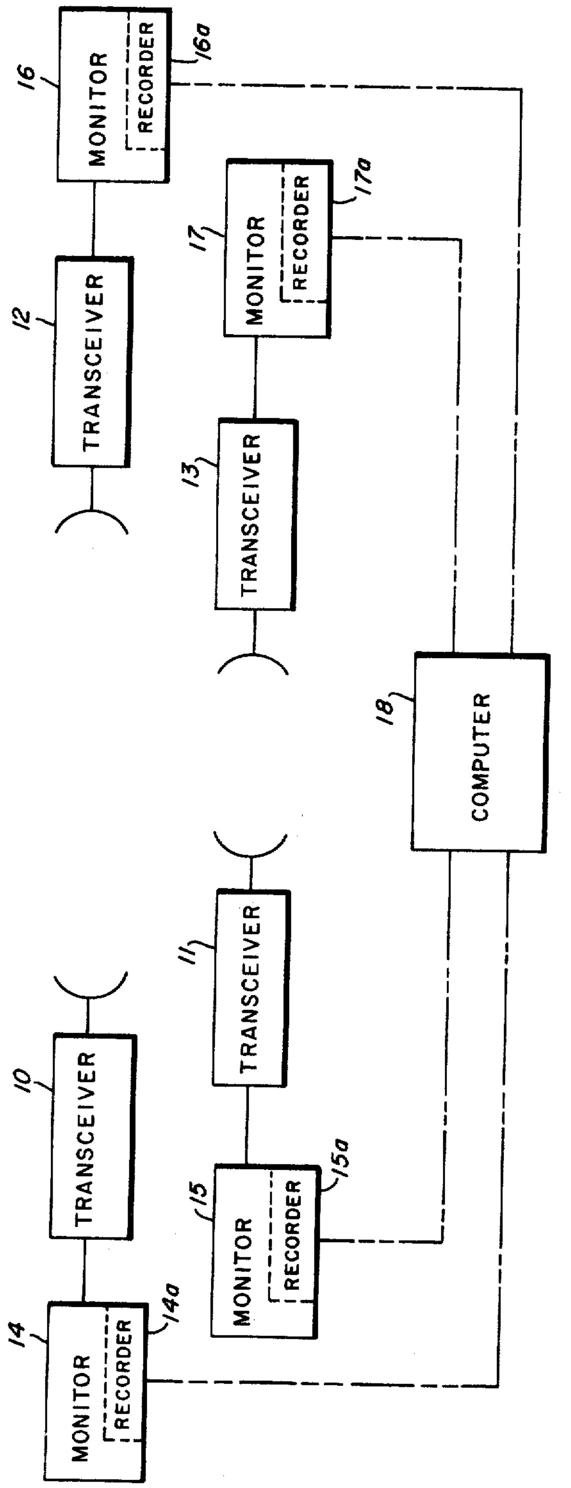

The invention described herein may be manufactured and used by or for the Government of the United States of America for governmental purposes without the payment of any royalties thereon or therefor.

The present invention relates to a monitor system and more particularly, to a communication network monitor system, and is a continuation-in-part of our co-pending patent application Ser. No. 257,348, filed Feb. 8 1963 and now abandoned.

In the operation of a data communication system it is desirable that the system be monitored in order that abnormal operation of the system can be detected. Abnormal operation may be defined as either simultaneous occurrence of certain system control level signals or, more frequent changes in control level signals than can be recorded by the monitoring system.

It is further desirable that a system be provided which will monitor each malfunction of the data communication station operating in a prescribed net and that all control level signal changes and their relative time occurrence be recorded in a form which may be analyzed on a computer. Such a form might be one wherein the control level signal changes and the relative time occurrence are recorded in binary form on punched paper tape. Tapes from all net stations may then be collected each day and analyzed on a computer. The computer program could tally all control faults and specify the stations in the net causing such faults.

An object of the present invention is to provide a monitor system for a multiple station communication network.

A further object of the present invention is to provide a data communication monitor system which is capable of monitoring and tabulating changes occurring at a rapid rate.

An additional object of the present invention is to provide a monitor system which records information relating to system changes in a form suitable for computer processing and analysis.

Another object of the present invention is to provide a data communication monitor system to record system control level signal changes which are at least partially interdependently generated within the communication network.

A further object of the present invention is to provide a monitor system which detects and records abnormal operations as may be evidenced by the simultaneous occurrence of certain control level signals or more frequency changes in such signal levels than can be recorded by the monitoring system.

To better understand these and other objects and advantages of the present invention reference is made to the accompanying drawings illustrating an embodiment of the invention.

Figure 2A:
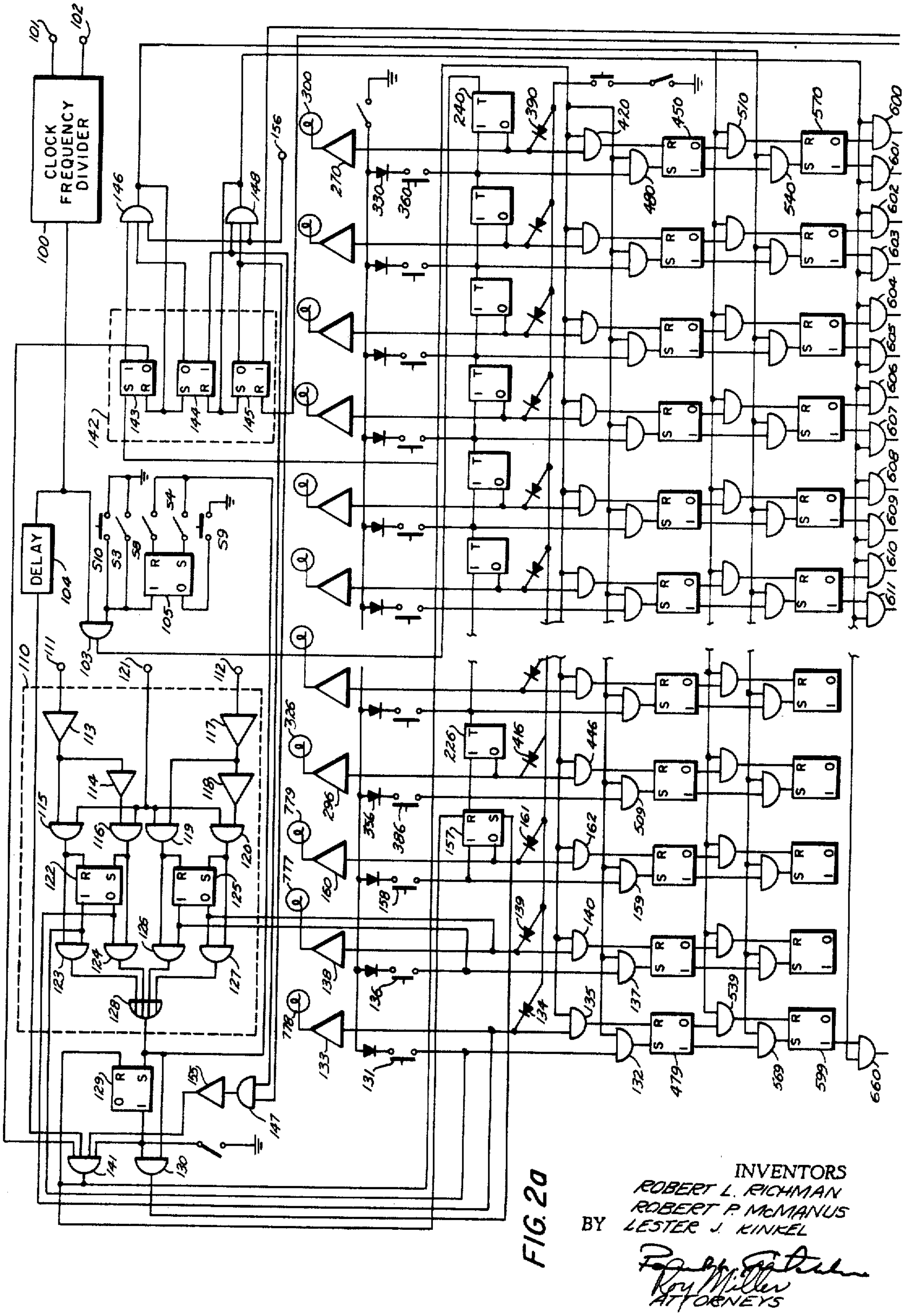
Figure 2B:
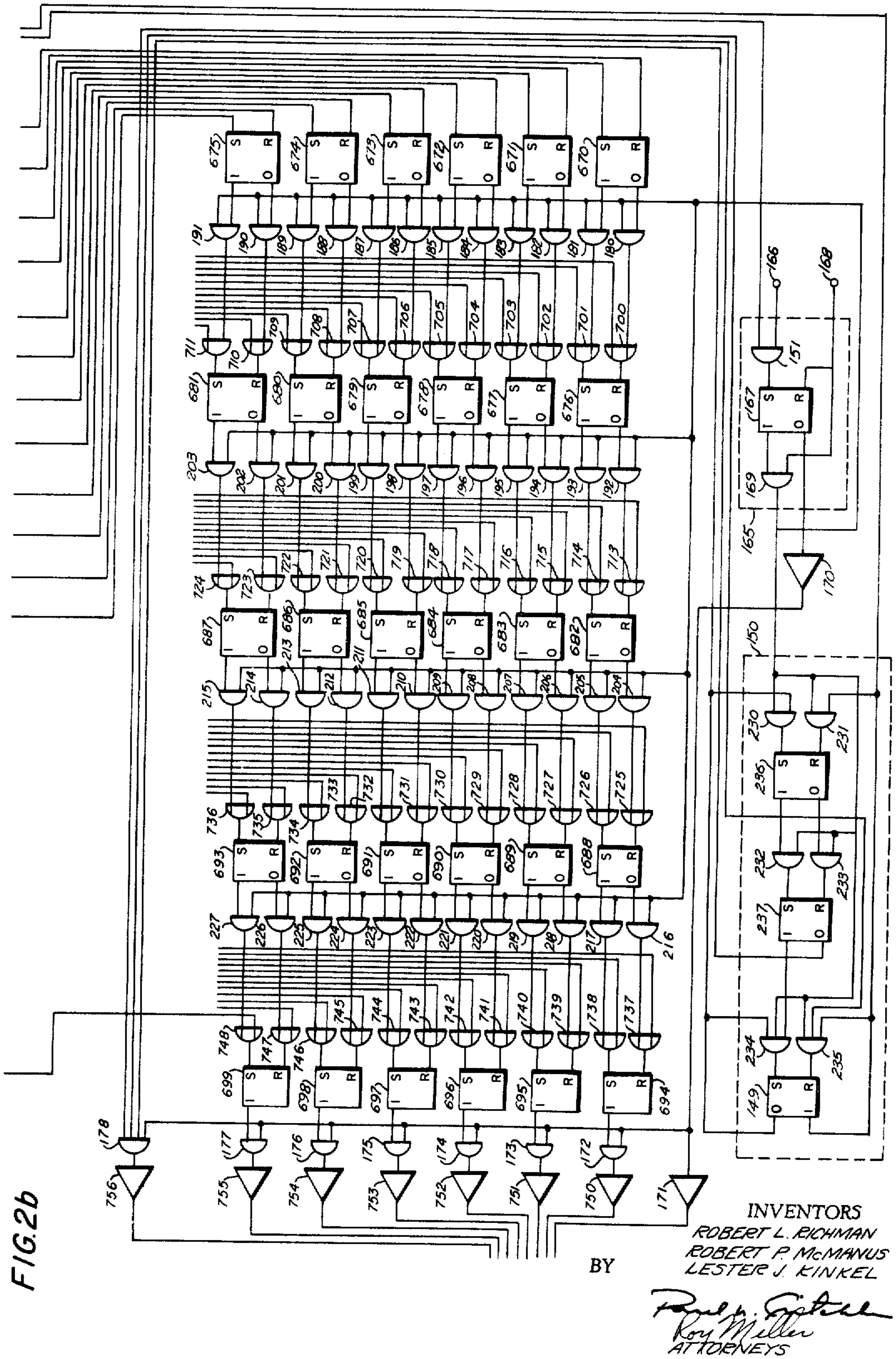

In the drawings:

FIG. 1 is a schematic block diagram illustrating a communication network together with monitors arranged to monitor the system in accordance with the concept of the present invention;

FIGS. 2*a* and 2*b* are a composite schematic wiring diagram illustrating one monitor in the monitor system of the present invention.

Referring now to FIG. 1 there is shown a plurality of transceivers 10, 11, 12, and 13 which may be included in a communication network. Associated with each of the transceivers 10, 11, 12 and 13 is a monitor as indicated at 14, 15, 16 and 17, respectively. It will be appreciated by those skilled in the art that the monitoring system of the present invention is conceived and designed to monitor any multiple station communication network and that the four transceiver stations comprising the communication network illustrated in FIG. 1 are employed merely for purposes of explanation and that a communication network to be monitored by the system of the present invention may comprise any number of stations disposed in any configuration. Such stations may be land-based, surface vessels, aircraft, space vehicles or any combination of such stations.

It will be noted in FIG. 1 that each of the monitors 14, 15, 16 and 17 has included therein a recorder as indicated at 14*a*, 15*a*, 16*a*, and 17*a*. As contemplated by the present invention, a monitor is associated with each of the stations within the communication network to monitor and record certain control levels of signals as may be desired together with appropriate time reference signals indicating the time occurrence of such control level signals. Further it is contemplated that such recorded information be fed into a computer at a convenient point in time for analysis and detection of abnormal operation of any one or more of the monitored stations in the communication network, as well as any abnormal operation of the communication network system overall.

FIG. 1 shows by dash line connection the recorders 14*a*, 15*a*, 16*a* and 17*a* feeding the recorded data into a computer 18 which may be any appropriate data processing means capable of being programmed or adapted to the detection of predetermined abnormal conditions of operation. It will be appreciated by those skilled in the art that the criteria of abnormal operation may be any indicia or selected parameters of performance. Such indicia or criteria may readily be programmed into the computer to be stored and employed for determining the abnormal operation of one or more stations in the communication network being monitored. Such abnormal operation or malfunction is revealed by the recorded control level signals, and particularly as the control level signals relate to the time reference information which is also recorded by the plurality of recorders 14*a*, 15*a*, 16*a* and 17*a*.

As a simple example of the type of abnormal operation which may be readily detected by the monitor system of the present invention, it may be assumed that the transceivers 10, 11, 12 and 13 are so arranged and designed that when one such transceiver such as 10, for instance, goes into a "transmit" mode of operation, the remaining transceivers 11, 12 and 13 should normally and properly revert to a "receive" mode of operation. If it be further assumed that one of the transceivers 11, 12 and 13 is in the "transmit" mode of operation at the same time that the transceiver 10 is in the "transmit" mode of operation, a malfunction or abnormal operation within the communication network is occurring.

However, it is important to appreciate in the context of the present invention that such occurrence of two stations in the "transmit" mode is only abnormal operation or a malfunction when the two stations are in the transmit mode of operation simultaneously. Obviously, within the contemplation of the operation of the communication network as illustrated in FIG. 1, one or more stations may properly enter upon the transmit mode of operation sequentially. Thus, the present invention is concerned with detecting the abnormal operation or malfunction within the communication network system where the control level signals being monitored and recorded together with appropriate time reference data may be at least partially interdependently generated within the communications network. Accordingly, the indication of malfunction or abnormal operation may reside wholly in the fact that such control level signals are evident of a simultaneous occurrence within the system, which control level signals would not be indicative of a malfunction or abnormal operation had they occurred sequentially.

The operation of each of the monitors of the present invention as included in the monitor system will be better understood from the following description of a detailed schematic wiring diagram of one such monitor as is illustrated by the composite diagram of FIGS. 2*a* and 2*b*.

In the illustration of FIGS. 2*a* and 2*b*, a clock frequency divider 100 is provided to produce an output comprising a one kilocycle pulse which is utilized as a real time reference. The clock frequency divider 100 comprises a series of flip-flops, not shown, and associated circuitry which is conventional. A clock pulse is coupled to input 101 as an enabling pulse for circuitry which is used in conjunction with the flip-flops. A 10 kc. input is coupled to 102, which input is divided down by ten to provide the 1 kc. output The output of the clock frequency divider is coupled to an AND gate 103 and also coupled to a delay one shot 104. Another input to AND gate 193 comprises the output of an RS flip-flop 105. The output from RS flip-flop corresponding to a binary one A is used as one of the inputs to the AND gate 103. The flip-flop 105 and associated circuitry is utilized as a clock disconnect circuit The associated circuitry comprises S10, S3, S8, S4 and S9.

S9 is connected between ground and the zero output of the RS flip-flop 105. S4 is connected between the output of an OR gate 128 in a transition detector 110 and the reset input of the flip-flop 105. S8 is connected between the output of OR gate 128 and the set input of the flip-flop 105. Switches S3 and S10 are connected in parallel between ground and the ONE output of flip-flop 105.

The function of the switches will be explained in a later portion of the specification with regard to various modes of operation of the system.

The transition detector 110 comprises means for detecting abnormal or unusual operation in the system being monitored. As previously stated, the abnormal operation is defined as either simultaneous occurrences of certain monitor control levels or more frequent changes in levels than can be recorded by the monitoring system itself. Thus, the transition detector 110 is connected to the communication net and detects changes in the system. The transition detector has two inputs 111 and 112 which correspond to a Tx input and $M_P$ input respectively. The Tx input at 111 is coupled to an input amplifier 113 the output of which is coupled to another amplifier 114 and also coupled as one input to an AND gate 115. The output of amplifier 114 is coupled as one input to AND gate 116.

The input at 112 corresponding to the $M_P$ input is also coupled to an input amplifier 117 the output of which is connected to an amplifier 118 and also as one input to AND gate 119. The output of amplifier 118 forms one input to AND gate 120. The enabling pulse for AND gates 115, 116, 119 and 120 is applied at input 121 and comprises a clock pulse such as coupled to input 101 in the clock frequency divider 100.

The output of AND gate 115 is coupled both to the reset input of a flip-flop 122 and in addition forms one input to an AND gate 123. The other input to AND gate 123 comprises the one output of the RS flip-flop 122. The output of AND gate 116 is coupled to the set input of flip-flop 122 and also forms one input to an AND gate 124.

The output of AND gate 119 is coupled to the reset input of a flip-flop 125 and also forms one input to an AND gate 126. The output of AND gate 120 is coupled to the set input of RS flip-flop 125 and also forms one input to an AND gate 127. The other input to AND gates 126 and 127 comprises the ONE and ZERO output of RS flip-flop 125 respectively.

The outputs of AND gates 123, 124, 126 and 127 are coupled to OR gate 128 the output of which is connected to the set input of RS flip-flop 129. The same output from OR gate 128 also forms one input to an AND gate 130 and also forms the input to S8 and S4 mentioned previously.

The flip-flops 122 and 125 comprise part of a 30 bit status time register which will be described in detail at a later point in the specification. At this time it is sufficient to note that the ONE ouput of flip-flop 122 is connected to one side of a single pole set switch 131 and also forms one input to an AND gate 132. The ZERO output of RS flip-flop 122 is connected to one side of an amplifier 133, the cathode of a diode 134 and also forms one input to an AND gate 135.

The ONE output of RS flip-flop 125 is connected to one side of a single pole set switch 136 and also forms one input to an AND gate 137. The ZERO output of RS flip-flop 125 is connected to one side of an amplifier 138, the cathode of a diode 139 and also forms one input to an AND gate 140.

An abnormal situation bit is also supplied and this bit will be used to indicate simultaneous or more frequent changes in levels than can be recorded by the monitoring system. Thus, the ONE output of RS flip-flop 129 forms another input to AND gate 130. In addition, this same output also forms one input to an AND gate 141. This same ONE output from RS flip-flop 129 is also connected through switch S11 and switch S6 to ground.

In order to explain the operation of the abnormal bit indicator it is necessary to describe the buffer fullness register 142 which comprises a series of RS flip-flops 143, 144 and 145. The output of AND gate 141 is connected to the set input of flip-flop 143 and also connected back to the reset input of flip-flop 129. The ONE output of flip-flop 143 forms one input to an AND gate 146 while the ZERO output of the flip-flop is connected as one input to AND gate 141.

The reset input on flip-flop 143 is taken from the output of AND gate 146 and this same output from AND gate 146 is also coupled to the set input of flip-flop 144, The ZERO output from the RS flip-flop 144 forms the other input to AND gate 146 while the one output is coupled to an AND gate 147 and also forms one input to an AND gate 148.

The reset input for RS flip-flop 144 is taken from the output of AND gate 148 and this same output also comprises the set input to RS flip-flop 145. The ZERO output from flip-flop 145 forms the other input to AND gate 147 and also forms another input to AND gate 148. The reset pulse for flip-flop 145 is taken from the ONE output of an RS flip-flop 149 contained within a tape format counter 150 while the ONE output from flip-flop 145 is coupled as one input to an AND gate 151.

The output of AND gate 147 is coupled to an amplifier 155 the output of which forms another input to AND gate 141. In order to enable the AND gates 146 and 148 a final input comprising a clock pulse is applied from input terminal 156.

Another output is taken from AND gate 141 and coupled to the reset input on an RS flip-flop 157. This corresponds to the reset abnormal input. The output from AND gate 130 is coupled to the set input on flip-flop 157 and corresponds to the abnormal set. The ONE output from flip-flop 157 is connected to one side of a set switch 158 and also forms one input to an AND gate 159 while the ZERO output of flip-flop 157 is connected to an amplifier 160, the cathode side of a diode 161 and in addition forms one input to an AND gate 162.

A circuit is provided for synchronizing the punch motor, not shown, to the buffer storage and is called a punch resume circuit 165. Included within this circuit is the AND gate 151 which has one input which comprises the ONE output of flip-flop 145 and another input which comprises a "ready" pulse coupled in from terminal 166. The output of AND gate 151 comprises the set input for RS flip-flop 167 while the reset input to flip-flop 167 is taken from input terminal 168. The input coupled to 168 comprises a "resume" pulse from the punch which is used to perforate the paper taps used in the present invention. This same pulse is also coupled as one input to AND gate 169 the other input to which comprises the ONE output from RS flip-flop 167. The ZERO output from the flip-flop 167 is coupled to through amplifier 170 to another amplifier 171 and also forms the enabling pulse for a set of AND gates 172 to 178. The output of the amplifier 171 controls the transfer of the information from the last buffer storage register onto the tape.

The output of AND gate 169 corresponds to an enabling pulse for the gates on the third buffer register connected with a serial shift operation. Hence, the output from AND gate 169 forms the enabling input to AND gates 179–191, AND gates 192–203, AND gates 204–213, and AND gates 216–227. Thus, when a full pulse and a ready pulse are "anded" at the input of AND gate 151 setting the flip-flop 167 to a ONE and a "resume" pulse from input 168 is anded against the one output from AND gate 169 and the respective AND gates 179–227 are enabled.

The output from AND gate 169 is also coupled as one input to AND gates 230–235 contained within tape format counter 150. The other input to AND gate 230 comprises the ZERO pulse from RS flip-flop 149 while the other input to AND gate 231 comprises the ONE output from flip-flop 149. This same ONE output also forms one input to AND gate 235. The ZERO output from flip-flop 149 also forms one input to AND gate 234. The output of AND gate 230 comprises the set input to an RS flip-flop 236 while the output of AND gate 231 comprises the reset input to the same flip-flop.

The "ONE" output from flip-flop 236 is connected as the other input to AND gate 232 the output of which corresponds to the set input for a flip-flop 237. The zero output from flip-flop 236 forms the other input to AND gate 233 and also forms another input to AND gate 235 and in addition is coupled as one input to an AND gate 178. The output of AND gate 233 comprises the reset input for flip-flop 237. The output of AND gate 232 comprises the set input for flip-flop 237 while the ZERO output of the flip-flop is coupled as one input to AND gate 178. The "ONE" output from flip-flop 237 comprises a third input to AND gate 234 the output of which is coupled to the set line on flip-flop 149. The output of AND gate 235 is coupled to the reset input of flip-flop 149. The ZERO output from the flip-flop 149 comprises the fourth input to AND gate 178.

As has been previously stated the one output from flip-flop 149 is coupled both to the reset input of flip-flop 145 and forms one input to AND gates 235 and 231.

A status-time register comprising T flip-flops 240–266, and RS flip-flops 122, 125 and 157 is provided along with associated amplifiers 270–296, 133, 138 and 160 and associated indicator lamps 300–326 and 777–779. In that the T flip-flops and associated circuits are duplicated only some of each of the components are shown for the purposes of illustration. Also associated with each of the flip-flops 240–266 is a diode 330–356 respectively and associated set switches 360–386. The T flip-flop is merely a toggle which changes the state of the flip-flop from a ONE to a ZERO or ZERO to ONE depending on the condition of the flip-flop at the time an input pulse is applied to the T input. The ONE output of each of the respective T flip-flops 240–266 is coupled to the T input of the next succeeding flip-flop and is also coupled to one side of a respective set switch as at 360 and the cathode side of the associated diode such as at 330. The other side of the diode 330, i.e., the anode, is connected through S1 to ground. This is provided so that the respective T flip-flop may be set to ONE. The ZERO output from each of the T flip-flops as, for example, from flip-flop 240 is connected to one side of its respective associated amplifier as at 270 and from there connected to the neon indicator light as at 300. In addition this same output is coupled to the cathode side of a diode as at 390 the other side of which is connected to one side of S12 which is a clear switch and then through S2 to ground. In addition this same ZERO output is also coupled as one input to an associated AND gate as at AND gate 420. There are twenty-seven of these AND gates 420–446 plus AND gates 135, 140 and 162. The other input to AND gates 420–446 comprises the output of AND gate 141. In such a case when a ZERO output is present from flip-flop 240 and a pulse is present at the output of 141 the AND gate 420 will couple a pulse through to the reset line of an associated RS flip-flop 450. There are thirty of these flip-flops, i.e. 450–479, which comprise the first buffer storage register.

Another series of AND gates 480–509, 132, 137 and 159 are supplied for isolation between the ONE output from the T flip-flops 240–266 and RS flip-flops 122, 125 and 157. The outputs from these AND gates are coupled to the set input of the associated flip-flops 450–479. The other input to AND gates 480–509 and AND gates 132, 137 and 159 comprises the output of AND gate 141 so that when a pulse is present at the output of AND gate 141 and a ONE is present from the associated flip-flop the set line of the associated buffer storage flip-flop 450 through 479 is toggled and the flip-flop set to ONE. The ZERO outputs from flip-flops 450–479 are coupled as one input to AND gates 510–539 for isolating and timing purposes and a control function while the ONE output from the same flip-flops is connected as one input to AND gates 540–569. The other input to the respective AND gates 510–539 and AND gates 540–569 comprises the output from AND gate 146 which has received inputs from the flip-flops contained within the buffer fullness register 142. The outputs from AND gates 510–539 are coupled to the reset line of associated flip-flops 570–599 contained within the second buffer register. The output of AND gates 540–569 are coupled to the set line of the same flip-flops 570–599.

A third buffer storage register is provided and in that the paper tape has provisions for only a predetermined number of perforations in its width dimension a formating technique is used for changing the parallel 30 to serial 6 bit groups.

Thus, AND gates 600–660 are coupled to the ZERO and ONE outputs from flip-flops 570–599 constituting the second buffer storage register. The AND gates are connected such that the ZERO output of flip-flop 570 is connected as one input to AND gate 600, the one output from flip-flop 570 is connected as one input to AND gate 601, etc. The other input to AND gates 600–660 comprises the output from AND gate 148 which has inputs coupled thereto from flip-flops contained within the buffer fullness register 142. The output from the even numbered AND gates as at 600 through 610 are coupled to the reset line of flip-flops 670–675 contained within a register in the formating apparatus while the outputs of the odd numbered AND gates as at 601–611 are connected to respective set lines of flip-flops 670–675. The same applies for respective flip-flops 676–681, 682–687, 688–693 and 674–699 and associated respective AND gates.

OR gates 700–712 are associated with flip-flops 676–681, OR gates 713–724 are associated with flip-flops 682–687, OR gates 725–736 are associated with flip-flops 688–693 and OR gates 737–748 are associated with flip-flops 695–699. The output of flip-flops 670 through 675 is coupled to AND gates 179–191 in the following manner. The ZERO output is coupled to AND gate 179 and thence through OR gate 700 to the reset line of flip-flop 676. This repeats on down through the register as illustrated. The ONE output from flip-flop 670 is coupled to AND gate 180 and thence through OR gate 701 to the set line of flip-flop 676. This also repeats on down through the shift register as shown. In that the system merely repeats, no further explanation is deemed necessary at this time.

The final flip-flops 694–699 utilize only the ONE output therefrom which is coupled to AND gate 172–178. The outputs from AND gates 172–177 are coupled to respective amplifiers 750–755 and then a recorder as shown in FIG. 1 which may comprise the punches of a high speed paper tape mechanism. In addition, the output of AND gate 178 is also coupled to an amplifier 756 and comprises a "unique" marker which is coupled to the punch of the same high speed paper tape system.

Operation

In the operation of the system, the primary function of the invention is the detection of abnormal operation of a data communication system. The present system monitors each malfunction of the data communication system operating in a prescribed net. All control level changes and their relative time occurrence would be recorded in binary on the aforementioned punched paper tape. These tapes from all the net stations are then collected each day and analyzed on a computer. Through the use of this system the computer program will tally all control faults and specify the net stations causing the faults or fault.

The storage capacity of the present system is designed to accommodate the worst case of abnormal operation for the communication equipment control level. The monitoring consists of the recording of the time of occurrence of a transition of the selected control level along with the state of the control level at that time. Abnormal operation is indicated by the setting of a bit in the control frame of information.

The control frame is the first row of information punched on the paper tape and will be differentiated from other rows by having a seventh level "unique bit" marker. This would correspond to the output of amplifier 756. A total of 6 bits is reserved for control level monitoring, these would correspond to the outputs of flip-flops 122, 125, 157, 266, 265, 264. If fewer control functions are monitored, the remaining bits may be used as additional storage for the real time clock.

The bit which originates at flip-flop 157 in the status time register is referred to as the abnormal bit and its associated light 779 is the abnormal bit indicator. When the light lights this would identify the situation of the present system being full, with new information appearing at the inputs 111 and 112. Flip-flops 122 and 125 and their respective outputs corresponding to the bits will be used as monitors on two control levels identified as $P_x$ and $M_p$ occurring at input 111 and 112, respectively. Therefore, a logical ONE will indicate an "ON," i.e., light 777 or 778 will indicate a level change in the system.

Real time clock storage normally consists of 24 bits or approximately 4.66 hours at a 1 millisecond repetition rate; if three extra bits are used, the clock is capable of 37 hours of time storage.

There are three buffer registers for holding incoming data until storage on punched tape is completed. These comprise the aforementioned flip-flops 450–479, 570–599, and 670–699. A parallel transfer of all thirty bits from the status-time register appears throughout all three buffer registers. After information transfer into the third buffer register has been completed, a serial shift is performed for a transfer of the information onto a punched tape. Information is shifted out of the third buffer into a 7 bit transfer register which drives the magnetic coils of the punch driver, i.e., the output of 171 is used to enable the transfer of punch.

Control of the present system information handling is performed by four circuits. These circuits are: the transition detector 110, buffer fullness register 142, punch resume circuit 155, and tape format counter 150.

Whenever one or both of the communication system control functions change state, the transition detector 110 detects the change and initiates an output transfer from the status time register to the first buffer stage. This would occur, for example, if an input occurs at 111, then a logical ONE will appear at the output of flip-flop 122 which will be coupled to AND gate 132. The output from AND gate 123 will also be coupled through OR gate 128 to the set input of flip-flop 129. The output from AND gate 130 represents the abnormal situation when the levels are changing at the input faster than the system can monitor them, i.e., all registers full. Thus, if there is a pulse present at the set input 129 and the output pulse at 129 is also a ONE, the abnormal indicator flip-flop 157 will have a pulse coupled to the set input thereof indicating a too rapid change in the system for the system to monitor. In any event there is always an output from 141 which is coupled to an associated AND gates 420–426 and AND gates 135, 140 and 152. S4 is closed, therefore the output of OR gate 128 is also applied in the run mode to the reset line of flip-flop 105. When the run mode switch S3 is closed, one input to AND gate 103 is at ground potential therefore, the output of the clock frequency divider is always present and T flip-flops 240–266 are toggled at a 1 kilocycle rate. Depending on at what time the output of AND gate 141 occurs with respect to the associated T flip-flop an output will appear at one of the AND gates 420, 446 or 135, 140 and 162 or AND gates 480–509 and 132, 137 and 159.

Thus, when RS flip-flop 143 in the buffer fullness register 142 has a ZERO output therefrom and a pulse is present from the one kilocycle clock and ONES and ZEROS are present from flip-flops 144 and 145, respectively, at AND gate 147 an output occurs from AND gate 141 which is used to either set or reset the appropriate flip-flops 450–479. Whether the set or reset line is toggled would depend on the associated AND gates and the state of the T flip-flop preceding.

When the first buffer register is full, i.e., a ONE and ZERO appear at the input to AND gate 146 from flip-flops 143 and 144, respectively, the information is shifted into the second buffer register consisting of flip-flops 570–579. At the same time flip-flop 143 is reset to ZERO while flip-flop 144 is set to ONE. At this point a ONE appears at the input to AND gate 148 and if the third buffer register is empty as indicated by ZERO at the output of flip-flop 145, AND gate 148 is enabled and the buffer register unloads into the formating portion of the system wherein the 30 bit parallel is changed to serial 6 bit groups.

Transitions occurring at inputs 111 and 112 will be detected by the setting of both control bits at the same time. Transfer from the status-time register comprising the T flip-flops and RS flip-flops 122, 125 and 157 to the first buffer comprising flip-flops 450–479 is controlled by AND gate 141 which allows gating only when the clock register information is settled. This is accomplished by the use of the delay one-shot 104. In addition, a transition must have occurred, and then the buffer register will allow transferring of new information.

As indicated, gating of information into all the buffer registers is either partially or totally controlled by the buffer fullness register 142. Transfer from one register to another cannot be completed unless the following register is empty for acceptance of new information. This has been explained with reference to the use of the ONES and ZEROS and the setting and resetting of flip-flops 143–145. Such control is achieved by a sequence of events which set and reset the three flip-flops representing full or empty status of each buffer register. Output decoding of the flip-flops controls the transfer gates between buffer stages and also influences gating into the first buffer or the shifting of information onto tape.

The punch resume circuit 165 consists of the flip-flop 167 which drives those gates on the third buffer register connected with serial shift operation. The control of this flip-flop 167 is an Anding function of a "ready" pulse from input 166 and the fullness condition of the third buffer register as indicated by a ONE at the output of flip-flop 145. Resetting of the flip-flop 167 along with the transfer of the information onto tape is a function of the "resume" pulse as coupled to input 168 from the punch, not shown.

Keeping track of the serial shifting of information onto tape is a function of the format counter 150. Whenever a shift occurs, the counter counts up one. Upon reaching a count of five the counter resets to zero. This resets the third buffer fullness register to empty as indicated by the ONE appearing at the output of flip-flop 149, disables the punch drivers and the serial shift. The third buffer is then enabled for transfer of new information from the second buffer stage.

In the run mode of operation S1, S2 and S6 are opened while S3, S4, and S5 are closed. In order to calibrate and start all of the systems clocks at the same instant of time, a sync mode is required and in this mode S1, S2, S4 are closed while S3, S5, and S6 are open. During the sync mode the input of the AND gate 103 is inhibited by the clock disconnect flip-flop 105. This flip-flop is driven from the output of the transition detector 129 as shown. The first control level change in the communication system initiates an output of the transition detector 129. The control disconnect flip-flop changes state and AND gate 103 is enabled thereby actuating the clock frequency divider 100. Since each transition detector in the system is connected to the communication network and detects changes in the entire system as previously described, an abnormal condition or change of state is detected at each monitor at the same instant thereby actuating its time reference clock sources simultaneously. S4 functions as an input switch on the clock disconnect circuit. When S4 is closed, the flip-flop 105 input is connected to the output of the transition detector 129.

For operator monitoring the lamps indicate a ONE present at the normal output when lit. The switch associated with each lamp may be used to set a one. In addition, a subminiature button S12 is used to clear all bit positions of the status time register.

The punch and the method of applying power is not described in detail in that the circuitry is old and well known and is not material for an understanding of the invention.

A system has been set forth which monitors and records network system changes which occur either singly or simultaneously and in addition, indicate a condition when net changes are occurring more rapidly than the monitoring system can handle it. In addition, a system is provided wherein control level changes are put into a form which may be analyzed rapidly on computers or similar appropriate data processing equipment so that the system level changes are not only detected but in addition indicate the particular network station which has initiated the system level change or fault.

Moreover, the concept of the present invention provides a monitoring system for recording control level signals from a plurality of stations within a network, which control level signals may be at least partially interdependently generated between two or more of the stations, and such recorded control level signals are related to appropriate time reference signals so that the simultaneous occurrence of certain control level signals may thereafter be analyzed to detect abnormal operation or malfunction of one or more stations within the network because of such simultaneous occurrence.

It will be understood that various changes in the details, materials, sets and arrangements of parts, which have herein been described and illustrated in order to explain the nature of the invention, may be made by those skilled in the art within the principle and scope of the invention as expressed in the appended claims.

What is claimed is:

1. A monitoring system for a multiple station digital data network comprising:

signal receiving and transmitting means in each said station;

a monitor operatively associated with each of said stations for monitoring signals received at each station from all other stations in said network;

a transition detector connected with each said monitor to receive control level signals from each of said stations and adapted to produce binary digital output signals indicative of changes of state of said received control level signals;

a source of binary digital time reference signals operative in each monitor for producing time reference signals relative to the occurrence of said changes of state of said received control level signals;

actuating means in each said monitor responsive to the output signal of its associated transition detector for enabling each said source of time reference signals whereby a change of state of control level signal simultaneously received at each station synchronously actuates said sources of time reference signals at said multiple stations;

buffer means arranged to receive said time reference signals and said transition detector output signals for storing said transition detector output signals information relative to its time disposition; and recording means for recording said transition detector output signals in binary digital form relative to their respective time disposition.

2. A monitoring system as claimed in claim 1 wherein said buffer means includes binary shift registers.

3. A monitoring system as claimed in claim 1 wherein said recording means produces a punched tape output.

4. A monitoring system as claimed in claim 1 wherein said transition detector produces output signals distinctively indicative of each type of change of state represented by said received control level signals.

5. A monitoring system claimed in claim 1 and including data processing means having abnormal operation criteria stored therein for determining and indicating abnormal operation as detected in said received recorded data signals.

6. A monitoring system as claimed in claim 5 and including means responsive to the simultaneous occurrence of certain predetermined combinations of monitored interdependent control levels for detecting and indicating abnormal operation.

References Cited

UNITED STATES PATENTS

| | | | |
|---|---|---|---|
| 3,309,678 | 3/1967 | Sargent et al. | 340—172.5 |
| 2,957,046 | 10/1960 | Freeman et al. | 340—150 |
| 3,303,471 | 2/1967 | Duncan et al. | 340—172.5 |
| 2,905,520 | 9/1959 | Anderson | 340—172.5 |
| 2,493,543 | 1/1950 | Merchant | 340—258 |

GARETH D. SHAW, Primary Examiner

U.S. Cl. X.R.

340—150